(12) United States Patent
Kondziela

(10) Patent No.: US 7,665,024 B1
(45) Date of Patent: Feb. 16, 2010

(54) METHODS AND APPARATUS FOR CONTROLLING A USER INTERFACE BASED ON THE EMOTIONAL STATE OF A USER

(75) Inventor: James Mark Kondziela, Stamford, CT (US)

(73) Assignee: Verizon Services Corp., Arlington, VA (US)

( * ) Notice: Subject to any disclaimer, the term of this patent is extended or adjusted under 35 U.S.C. 154(b) by 566 days.

(21) Appl. No.: 10/200,898

(22) Filed: Jul. 22, 2002

(51) Int. Cl.
*G06F 3/00* (2006.01)

(52) U.S. Cl. .................. 715/745; 715/707; 715/744

(58) Field of Classification Search .......... 715/707, 715/728
See application file for complete search history.

(56) References Cited

U.S. PATENT DOCUMENTS

| | | | | |
|---|---|---|---|---|
| 4,964,077 | A * | 10/1990 | Eisen et al. ............... 715/707 |
| 5,493,608 | A * | 2/1996 | O'Sullivan ............... 379/88.04 |
| 5,535,321 | A * | 7/1996 | Massaro et al. ........... 715/707 |
| 5,874,943 | A * | 2/1999 | Fitzpatrick et al. ......... 345/159 |
| 6,363,145 | B1 * | 3/2002 | Shaffer et al. .......... 379/265.02 |
| 6,400,683 | B1 * | 6/2002 | Jay et al. ...................... 370/229 |
| 6,411,687 | B1 * | 6/2002 | Bohacek et al. .......... 379/88.21 |
| 6,542,602 | B1 * | 4/2003 | Elazar .................. 379/265.06 |
| 6,600,821 | B1 * | 7/2003 | Chan et al. ............. 379/265.07 |
| 6,636,236 | B1 * | 10/2003 | Toda .......................... 715/707 |
| 6,719,816 | B2 * | 4/2004 | Barford ........................ 44/535 |
| 6,724,887 | B1 * | 4/2004 | Eilbacher et al. ........ 379/265.03 |
| 6,925,613 | B2 * | 8/2005 | Gibson ....................... 715/864 |
| 7,073,129 | B1 * | 7/2006 | Robarts et al. .............. 715/740 |
| 7,440,900 | B2 * | 10/2008 | Chang ........................ 704/275 |
| 2001/0008850 | A1 * | 7/2001 | Komata ........................ 463/37 |
| 2002/0047858 | A1 * | 4/2002 | Bayliss et al. ................ 345/700 |
| 2002/0109602 | A1 * | 8/2002 | Shinada et al. .............. 340/576 |
| 2002/0149611 | A1 * | 10/2002 | May ............................. 345/706 |
| 2002/0194142 | A1 * | 12/2002 | Coffey ......................... 705/67 |
| 2003/0009341 | A1 * | 1/2003 | Cheng et al. ................. 704/275 |
| 2003/0051037 | A1 * | 3/2003 | Sundaram et al. ........... 709/227 |
| 2003/0125958 | A1 * | 7/2003 | Alpdemir et al. ............ 704/275 |
| 2003/0174831 | A1 * | 9/2003 | Dezonno et al. ........ 379/265.02 |
| 2003/0179229 | A1 * | 9/2003 | Van Erlach et al. ......... 345/744 |
| 2005/0234727 | A1 * | 10/2005 | Chiu ........................ 704/270.1 |

* cited by examiner

*Primary Examiner*—Ryan F Pitaro

(57) ABSTRACT

Methods and apparatus for modifying a user interface as a function of the detected emotional state of a system user are described. In one embodiment, stress analysis is performed on received speech to generate an emotional state indicator value, e.g., a stress level indicator value. The stress level indicator value is compared to one or more thresholds. If a first threshold is exceeded the user interface is modified, e.g., the presentation rate of speech is slowed. If a second threshold is not exceeded, another modification to the user interface is made, e.g., the speech presentation rate is accelerated. If the stress level indicator value is between first and second thresholds, user interface operation continues unchanged. The user interface modification techniques of the present invention may be used in combination with known knowledge or expertise based user interface adaptation features.

9 Claims, 6 Drawing Sheets

METHODS AND APPARATUS FOR CONTROLLING A USER INTERFACE BASED ON THE EMOTIONAL STATE OF A USER

FIELD OF THE INVENTION

The present invention relates to user interfaces and, more particularly, adaptive user interfaces which adapt in response to, e.g., a characteristic or state of a user.

BACKGROUND OF THE INVENTION

Electronic systems including computer systems that interact with human beings use what is commonly known as a user interface to control one or more aspects of machine/human interaction. User interfaces have provided formidable challenges to the user interface developers who normally seek to provide an interface which is both easy to use and efficient from a user's perspective. That is, a user interface should allow a user to accomplish a desired objective, e.g., receive a desired set of information or make a desired selection, without a lot of unnecessary user operations and without having to have menu options repeated, e.g., because of a lack of understanding upon initial presentation. It has been recognized that to provide an effective and efficient user interface, the interface should have flexibility and be able to adapt to the individual user.

The decision process of modifying the user interface to adapt to an individual user can be extremely difficult because the adaptation process attempts to customize the interface for a particular user often without specific knowledge of a user's current condition. A user's current condition may include such things as a user's intentions, goals, and/or informational needs, e.g., how experienced the user is with the system and/or what the user's knowledge base is.

Known user interfaces have focused on attempting to determine a user's experience level and/or goals and then modify the user interface accordingly. For example, users who are determined to be experts based on their amount of previous experience with a system may be presented less help when traversing menus and options than users who are determined to be novices at using an apparatus. Similarly, when a user's goal is determined to be a particular operation or one of a set of operations, e.g., based on previous menu selections, a user may be presented with specific menus tailored or arranged to facilitate the user's goal.

Such known systems focus on modifying a user interfaces fail to consider the impact of a user's emotional state at the time of using an apparatus. The inventor of the present application recognized that a user's emotional state can have an impact on a user's ability to interpret information provided to the user, make menu selections and perform other tasks commonly performed through use of a user interface. For example, when under extreme stress: angry, grieving, etc. a system user may find it more difficult to interpret and understand machine generated speech, menu options, etc., than under less stressful conditions.

Thus, it is very possible for a user to be fairly knowledgeable about a user interface on a particular system, but still be impaired in his capacity to interact with the user interface due to the presence of emotions, e.g., anxiety, grief, anger, etc. Such impairment can be either long or short term in nature.

In view of the above discussion, it becomes apparent that it would be desirable for a user interface to adapt in response to a user's emotional state. Accordingly, there is a need for methods and apparatus that allow a user interface for any product or service to detect the emotional state of a user and to be modified based upon a user's current emotional state (e.g., stress level). Furthermore, it would be desirable that at least some new user interfaces be able to make user interface modifications in response to a user's emotional state while also making modifications based on other known factors such as experience level and knowledge.

SUMMARY OF THE INVENTION

Figure 1:
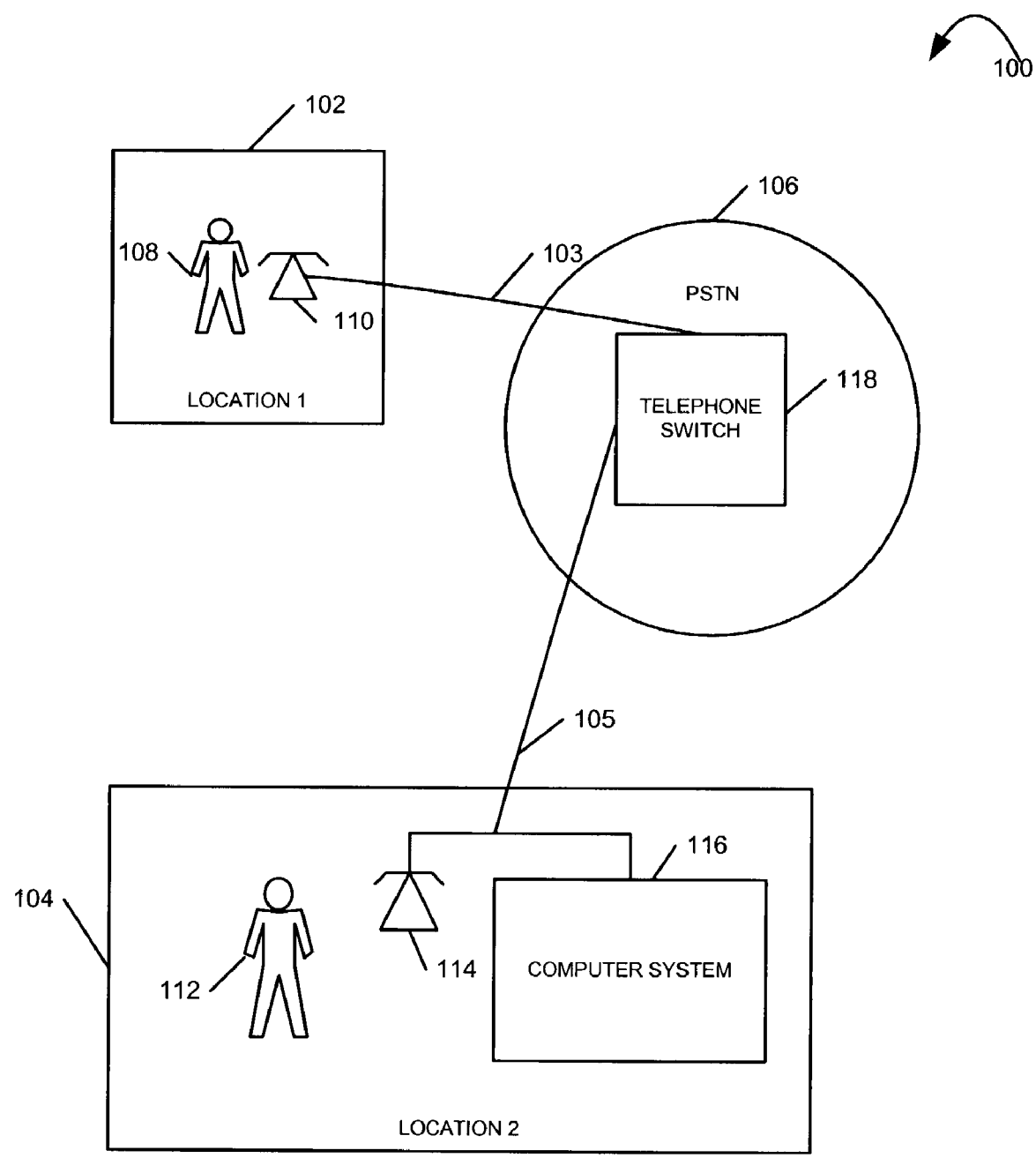
FIG. 1 illustrates a system implemented in accordance with the invention.

The present invention is directed to user interfaces and methods and apparatus for modifying a user interface as a function of the detected emotional state of a system user. The emotional state of the user may be, e.g., how stressed the user of the system is. The user's stress level may be detected, e.g., from received speech.

In one particular exemplary embodiment, stress analysis is performed on received speech to generate an emotional state indicator value, e.g., a stress level indicator value. The stress level indicator value is compared to one or more thresholds. If a first threshold is exceeded, e.g., indicating a highly stressed emotional state, the user interface is modified, e.g., the presentation rate of speech is slowed. If a second threshold is not exceeded, e.g., indicating a low stress or relaxed emotional state, an alternative modification to the user interface is made, e.g., the speech presentation rate is accelerated. If the stress level indicator value is between first and second thresholds, user interface operation continues unchanged.

In some embodiments, the emotional state indicator value is monitored over a period of time. If the emotional state indicator value continues to indicate a high level of stress, e.g., by a threshold being exceeded for a preselected period of time, despite user interface modifications, additional action may be taken such as transferring the user to a human operator, such as a customer service representative or 911 telephone operator. The transferring of a caller may be viewed as a modification of the user interface since it may involve transitioning from a fully automated interface to an interface which relies on at least some human operator involvement.

The user interface modification techniques of the present invention may be used in combination with known knowledge or expertise-based user interface adaptation features. Various exemplary modifications to a user interface which are made, alone or in combination, when a high level of stress is detected include:

a.) Adding reassuring voice prompts to be output for the user to hear e.g. "Good", "Well Done!", "That's right";

b) Using lengthier, more explanatory and helpful prompting, e.g. instead of asking only "Limit order or market order?", the system can explain, "Do you want a limit order or a market order? A limit order allows you to buy or sell a stock at a price you name, whereas a market order buys or sells a stock at the current market price.";

c) Modifying the rate or speed at which voice prompts are played to the user so that the voice prompts are played more slowly and intelligibly to the user;

d) Adding or increasing the duration of pauses between sentences or phrases so as to increase the intelligibility of the voice prompts to the user;

e) Breaking down sets of tasks which the user must perform in the course of a given application into smaller parts; e.g., instead of asking a user "Type of order?", the application might ask the stressed user "Buy or sell?" in one step, then "Market or limit order?" in another step, and "All-or-none or partial fill order?" in a third step, etc., and f) Modify voice prompts played to the user so that they are played in a different voice; e.g., female rather than a male voice or a child's voice rather than adult's voice.

When a low level of stress is detected, the inverse of one or more of the above described modifications may be performed, e.g., the presentation rates of voice prompts may be increased, the duration of pauses reduced in speech generated by the apparatus, etc.

While described in the context of voice analysis and stress detection, it is to be understood that the user interface modification technique is not limited to the emotional condition of stress and that modifications of the user interface based on other emotional states and indicators of emotional states is possible. For example, facial expressions of a user may be monitored using a camera and the input from the camera analyzed to generate an indicator of the user's emotional state. For example, if it is determined that the user is smiling it might be interpreted that the user is happy or contented while a detected frown might be interpreted as indicating that the user is unhappy and that interface modification of the type discussed above in the case of a stressed emotional state may be called for.

The user interface modification techniques of the present invention are well suited for use in a wide range of user interface applications including, e.g., personal computer applications, telephone operator applications, automated telephone directory applications, control system applications, etc.

DETAILED DESCRIPTION

FIG. 1 illustrates a system 100 including an adaptive user interface implemented in accordance with the invention for measuring voice stress during speech recognition and adapting a user interface in accordance with the present invention. The system 100 includes routines and hardware for call processing, for performing the communications operations, for performing speech recognition and analysis, and for performing interface modifications as a function of a measured stress level. The system supports communications between various locations via the public switched telephone network (PSTN) 106 and is capable of performing stress analysis on received speech. The system supports voice input for analysis from various locations.

The system 100 includes first and second locations 102, 104, coupled together by a communications network, PSTN 106. Location 1, which may be, e.g., a first customer premise such as a home or office, includes communication equipment, e.g., a telephone 110, and a person 108. The telephone 110 is coupled to a telephone switch 118 of the PSTN 106 via a communications channel 103 which may be, e.g., a telephone line.

Location 2 104 includes additional communication equipment, e.g., a second telephone 114, a computer system 116, and a person 112. Both the second telephone 114 and the computer system 116 are coupled to the telephone switch 118 of PSTN 106 via communication channel 105. Accordingly, both the telephone 114 and the computer system 116 can receive and transmit audio signals including speech via PSTN 106. Individuals 108 and 112 represent two potential sources of speech. As will be discussed further below, computer 116 performs stress analysis on speech reached via telephone line 105 or from a local speech source and modifies a user interface in accordance with the invention based on detected stress levels.

Figure 2:
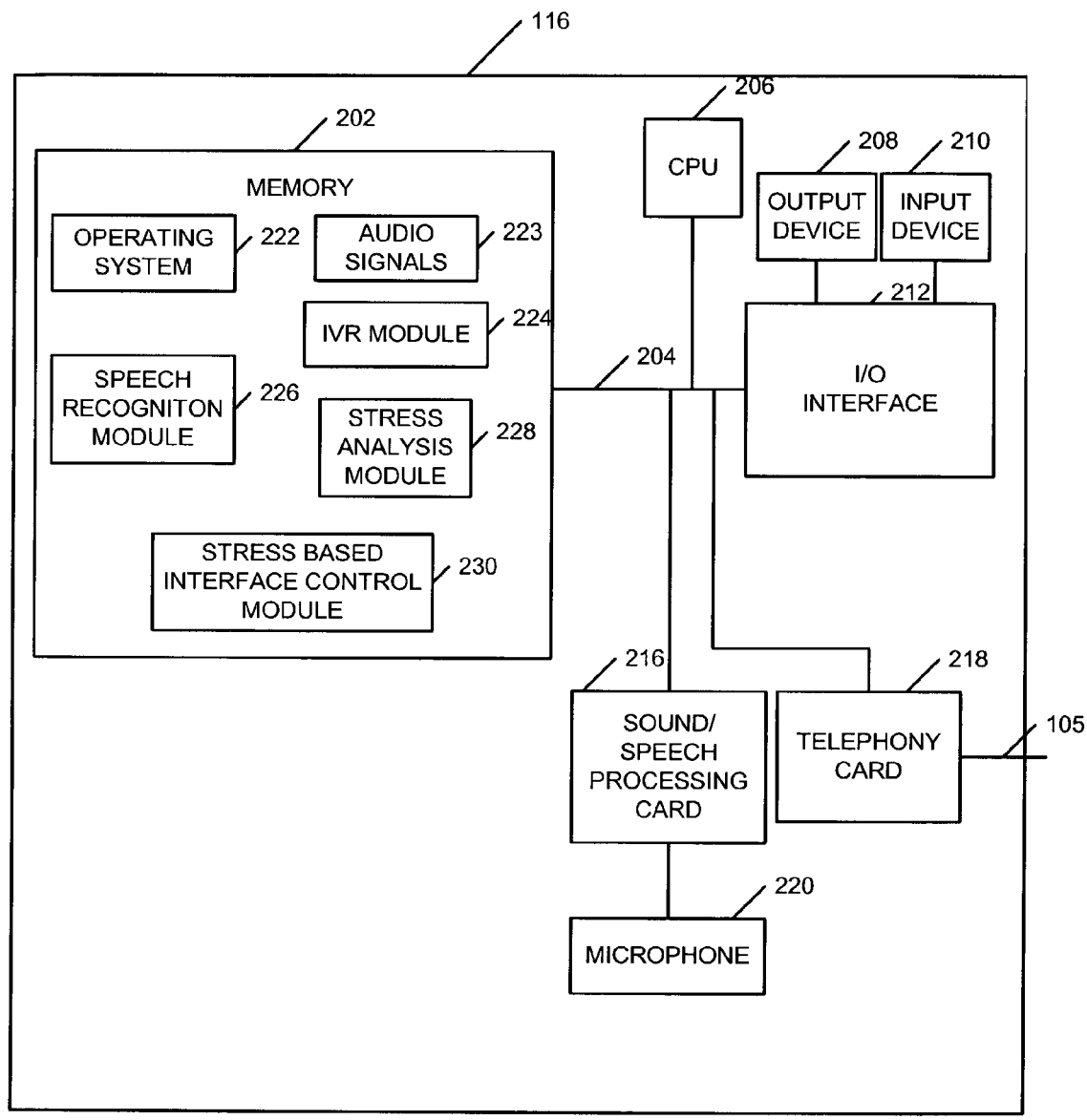
FIG. 2 illustrates a computer system responsible for performing stress analysis on speech in accordance with the invention.

FIG. 2 shows the computer system 116 in greater detail. The computer system 116 includes a memory 202, a central processing unit (CPU) 206, an I/O interface 212, a sound/speech processing card 216, a telephony card 218, and a microphone 220. The memory 202, the CPU 206, the I/O interface 212, the sound/speech processing card 216, and the telephony card 218 are coupled together by a bus 204 as shown. An output device 208 and an input device 210 are coupled to the I/O interface 212, which performs signal conversion and other interfacing functions allowing the devices coupled to bus 204 to interact with I/O devices 208, 210, respectively. Output device 208 may be, e.g., a display and/or speaker while input device 210 may be, e.g., a keyboard, a camera, a sound detection device, etc. Microphone 220, which serves as one exemplary source of audio input, e.g., speech, is coupled to the sound/speech processing card 216. The sound/speech processing card 216 can also receive audio input from, e.g., telephony card 218 via bus 204. Thus, sound/speech processing card 216 can receive and process either local audio signals or signals received by the telephony card 218 from the PSTN 106. Thus a user may be local or remotely located.

The memory 202 includes a plurality of modules including an operating system 222, an interactive voice response (IVR) module 224, a speech recognition module 226, a stress analysis module 228, and a stress-based interface control module 230. While shown as part of the memory 202, it is to be understood that each of the modules 222, 224, 226, 228, 230 can be implemented using hardware, software, or a combination of hardware/software. In the case of a hardware/software combination, the software portion of the module would be stored in memory 202 with the hardware being included elsewhere in the system 116. The memory 202 may also be used for storing audio signals 223, e.g., to be processed by the sound/speech processing card 216. The operating system 222 performs the overall control and management of the computer hardware and interacts with the IVR module 224, the speech recognition module 226, the stress analysis module 228, and the stress-based interface control module 230 to facilitate their operation. The IVR module 224 may be implemented using standard commercial interactive voice response software operating alone or in combination with speech recognition module 226. Speech recognition module 226 may be implemented using known speech recognition software configured in accordance with the present invention to perform speech processing functions which may include speech recognition and to pass appropriately formatted speech samples to the stress analysis module 228. The stress analysis module 228 receives formatted samples of the user's speech as input and outputs a numerical quantification of the user's stress level. The stress analysis module 228 may be implemented using commercially available truth-verification software packages, e.g., TrusterPro by Trustech Innovative Technologies LTD. of Tel Aviv, Israel, which are capable of outputting such stress indicator levels. The stress-based interface control module 230 receives the numerical output from the stress analysis module 228, e.g., one for each sampled speech frame, and modifies the user interface as a function of the stress level indicator value, thereby adapting the interface as a function of the user's current stress level as detected by stress analysis module 228.

Figure 3A:
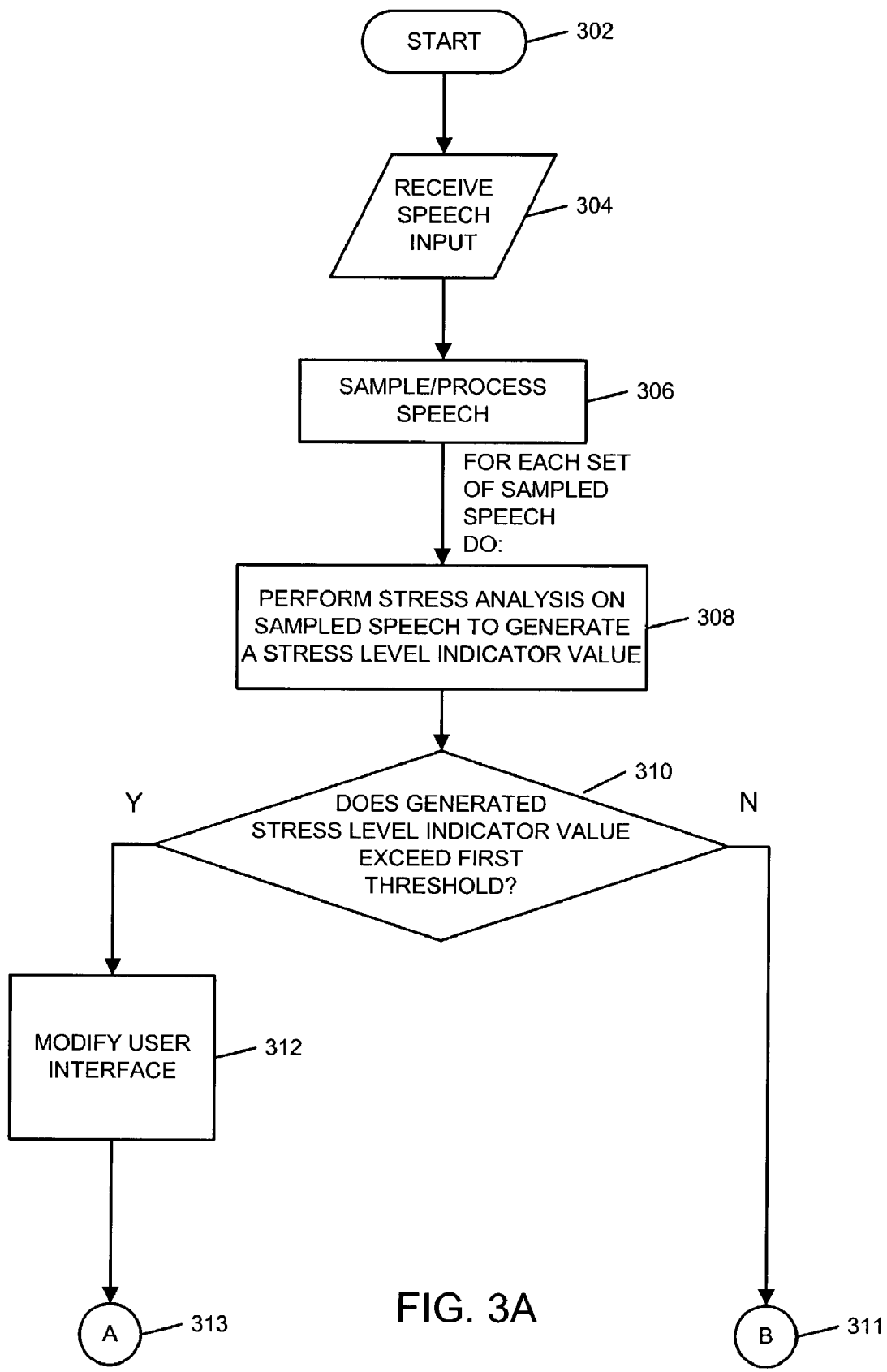
FIG. 3, which comprises the combination of FIGS. 3A and 3B, is a flow diagram showing the steps of a method of the present invention.
Figure 3B:
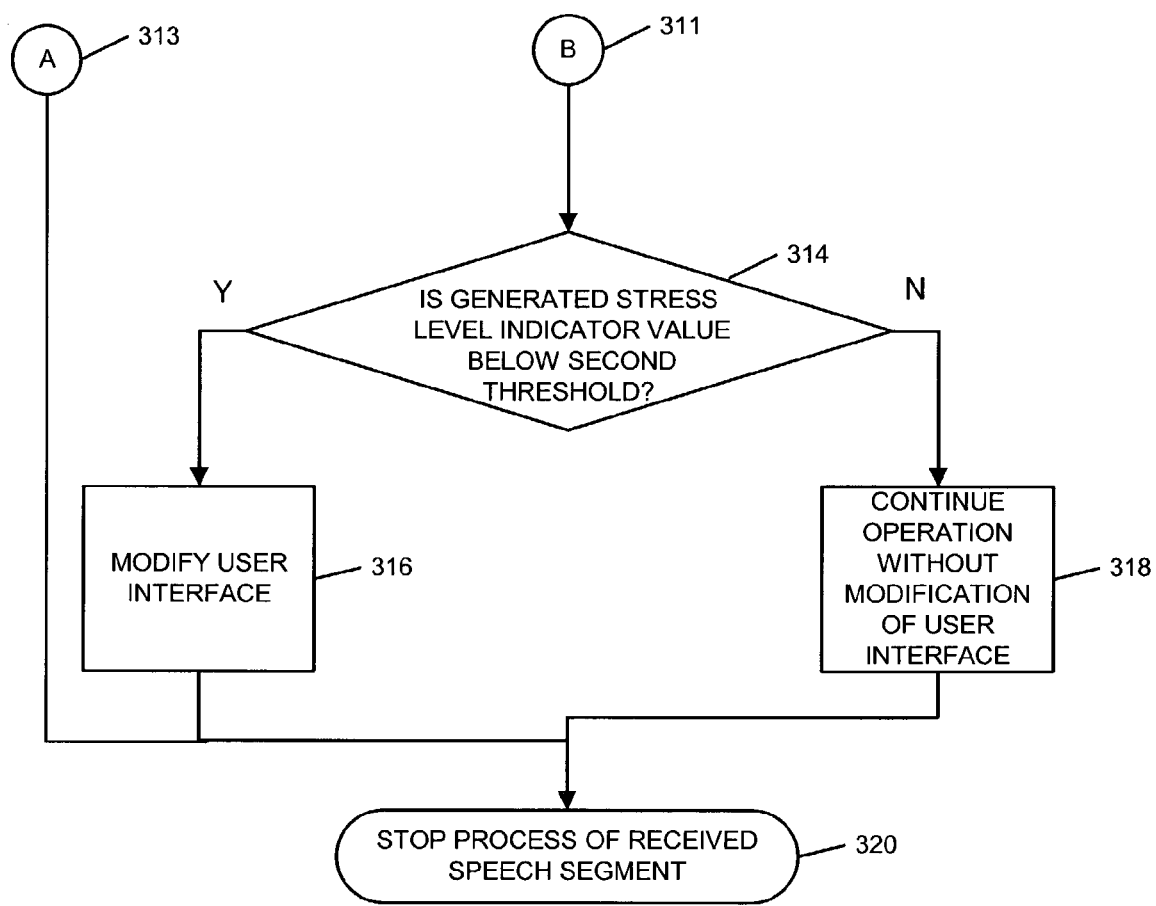

FIG. 3 shows the steps of an exemplary method of the present invention, which may be performed by the computer system of FIG. 2. Operation begins with start step 302 with the computer system being powered up and executing various modules stored in its memory 202. Operation proceeds from start step 302 to 304, wherein the computer system 116 receives speech input. The speech input may be obtained from the sound/speech processing card 216 via the microphone 220 or the telephony card 218. The received speech is sampled in step 306 by the sound/speech processing card 216, e.g., under direction of the speech recognition module 226. In step 306, the sampled speech is processed to produce sets of sampled speech, e.g., frames. Each set of sampled speech produced in step 306, is subject to further processing beginning in step 308. In step 308, the stress analysis operation is performed by the stress analysis module 228, and a stress level indicator value is generated. One such value may be generated for each frame or for a set of frames, e.g., 5 frames. Over time, multiple stress level indicator values are generated. The stress level indicator value generated in step 308 is analyzed in step 310, e.g., by stress-based interface control module 230, to determine if it exceeds the first threshold. If the first threshold is exceeded, the user interface is modified in step 312 in accordance with the present invention. Some examples of user interface modifications used in various embodiments include: addition of reassuring prompts, lengthier explanations, decrease of rate of prompts, increases in pause durations, or forwarding to a human operator. Additional examples are discussed with respect to FIG. 4.

If the first threshold for modifying the user interface is not exceeded, the stress level indicator value generated in step 308 is analyzed in step 314, e.g., by stress-based interface control module 230, to determine if it is below a second threshold. If the stress level indicator value is below the second threshold, the user interface is modified in step 316 in accordance with the present invention. Some examples of user interface modifications used in various embodiments include: briefer prompts, shorter or truncated explanations, increased rate of prompts, or decrease in pause durations. If the stress-based indicator level is equal to or greater than the second threshold, operation proceeds to step 318, where the processing continues without modification of the user interface. Operation proceeds from either steps 312, 316, or 318 to step 320, where the processing of the received speech segment for purposes of controlling the user interface is stopped. Processing of additional speech input in accordance with the method of FIG. 3 may continue over time with modifications to the user interface over time being made as a function of detected stress level.

Figure 4A:
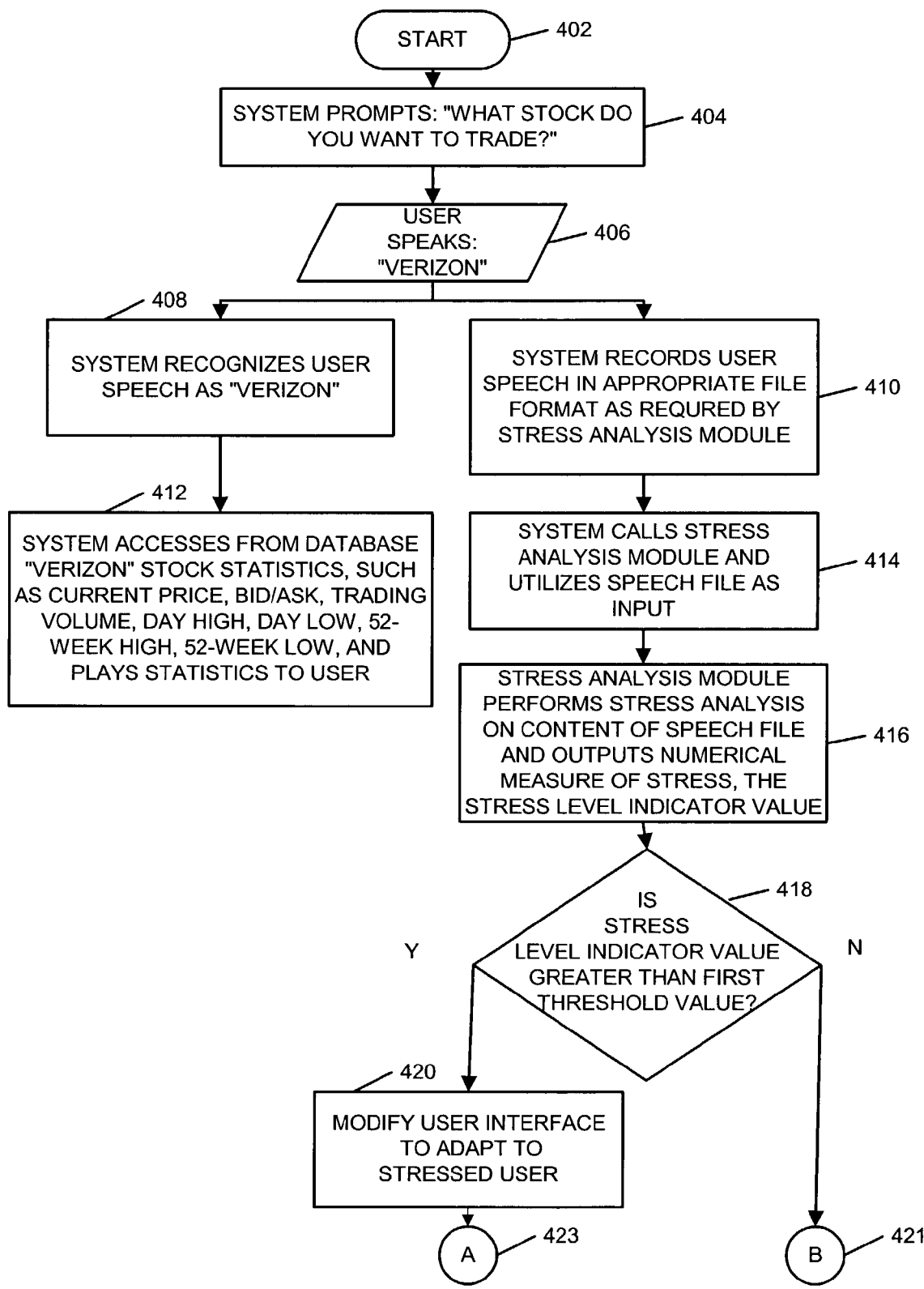
FIG. 4, which comprises the combination of FIG. 4A and FIG. 4B, is a flow diagram showing a particular exemplary embodiment of the method of the present invention.
Figure 4B:
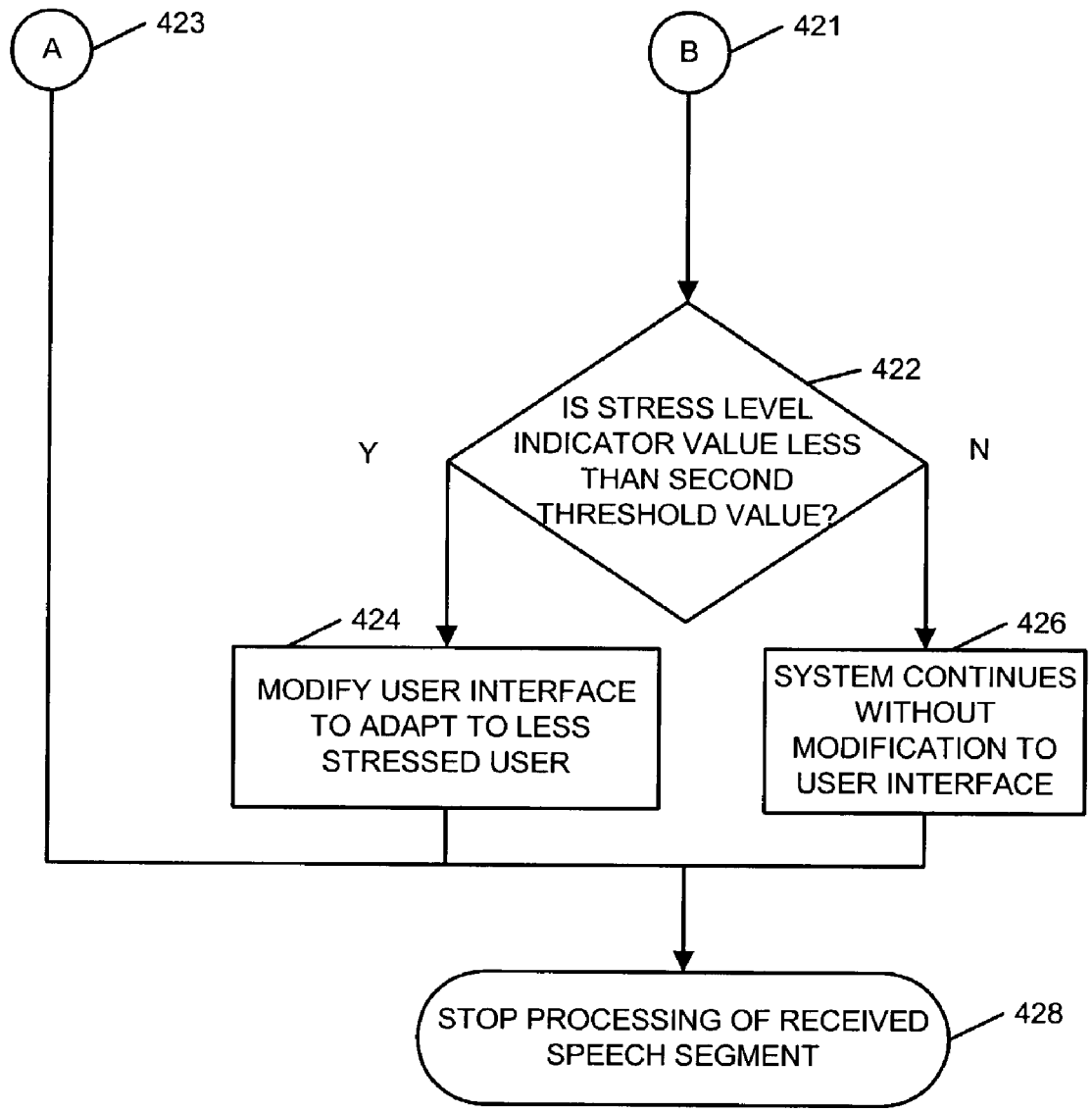

FIG. 4 shows a particular embodiment of the invention as a stockbroker analysis. Operation begins with start step 402 with the computer system being powered up and the execution of various modules stored in its memory. Operation proceeds from start step 402 to 404. In step 404, the computer system 116 prompts the person (user) 108 at location 1 102 or the person (user) at location 2 104 with a message e.g. "What Stock Do You Want to Trade?" In the case where said person is located at location 1 102, the prompt is transmitted via PSTN 106. In the case where the user of the system is present at location 2 104, the generated speech would be the output of a local output device 208, e.g., speaker. In the next step 406, the person (user) 108 or 112 speaks and responds with an answer, e.g. "Verizon". In the case where said person is located at location 1 102, the speech is received by telephone 110 at location 1 and transmitted via PSTN 106 to the telephony card 218 of computer system 116 at location 2 104. In the case where the user of the system is present at location 2 104, the speech is received by the computer system 116 via either a microphone 220 or a telephone 114 connected to telephony card 218.

The speech input obtained in step 406 is input to steps 408 and 410. In step 408, the speech recognition module 226 recognizes the user speech as the word "Verizon" and proceeds in step 412 to access from its database "Verizon" stock statistics e.g. current price, Bid/Ask, trading volume, Day High, Day Low, 52 week high, 52 week low, and plays statistics back to person (user) 108 or 112. In step 410, the system records user speech in an appropriate file format in memory 202, as required by the stress (truth) analysis module 228. In the next step 414, the system calls the stress (truth) analysis module 228 using the speech file generated in step 410 as input. The flow proceeds to step 416, where the stress (truth) analysis module 228 uses its proprietary algorithm on the speech file and outputs a numerical measure of stress, the stress level indicator value. The stress level indicator value obtained in step 416 is evaluated in step 418 by the stressed based interface control module 230. If the stress level indicator value is greater than the first threshold value, the flow proceeds to step 420. In step 420, the stress-based interface control module 230 modifies the user interface to adapt to the stressed user.

Examples of adaptations to the user interface that can be made include:

a.) Reassuring voice prompts can be added to the output for the user to hear e.g. "Good", "Well Done!", "That's right".

b) Lengthier, more explanatory and helpful prompting can be outputted e.g. instead of asking only "Limit order or market order?" the system can explain, "Do you want a limit order or a market order? A limit order allows you to buy or sell a stock at a price you name, whereas a market order buys or sells a stock at the current market price."

c) Rate, or speed, at which the voice prompts are played to the user can be slowed, so that the voice prompts are played more slowly and intelligently to the user.

d) Pausing between sentences can be increased, so as to increase the intelligibility of the voice prompts to the user.

e) A set of tasks which the user must perform in the course of a given application may be broken down into smaller parts; e.g. instead of asking a user "Type of order?", the application might ask the stressed user "Buy or sell?" in one step, then "Market or limit order?" in another step, and "All-or-none or partial fill order?" in a third step, etc.

f) Voice prompts played to the user can be played in a different voice; e.g. female rather than male voice, or a child's voice rather than adult's voice.

g) For very high stress levels, with no detected lowering of the stress level indicator value through automated computer responses, the user could be switched to a human phone operator.

h) Unlimited variations in programming logic can direct the stressed user down a different path than the non-stressed user.

If the first threshold for modifying the user interface is not exceeded, the stress level indicator value generated in step 416 is analyzed in step 422, e.g., by stress-based interface control module 230, to determine if it is below a second threshold. If the stress level indicator value is below the second threshold, the user interface is modified in step 424 in accordance with the present invention to adapt to the less stressed user.

Examples of adaptations to the user interface that can be made in the case of a low level of stress as indicated by the stress level indicator being below the second threshold include:

a) Reduce the number of reassuring voice prompts utilized.

b) Briefer, abbreviated prompting can be outputted e.g. instead of asking "Do you want a limit order or a market order? A limit order allows you to buy or sell a stock at a price you name, whereas a market order buys or sells a stock at the current market price." the system could prompt only, "Do you want a limit order or a market order?"

c) Rate, or speed, at which the voice prompts are played to the user can be accelerated, so that the voice prompts are played more rapidly for the more comfortable user.

d) Pausing between sentences can be decreased, so as to decrease the total time required for the transaction.

e) A set of tasks which the user must perform in the course of a given application may be consolidated; e.g. instead of asking a user "Buy or sell?" in one step, then "Market or limit order?" in another step, and "All-or-none or partial fill order?" in a third step, etc., the application might simply ask the less stressed more comfortable user simply "Type of order?" in one step.

f) Unlimited variations in programming logic can direct the less stressed user down a different path than the more-stressed user.

If the stress-based indicator level is equal to or greater than the second threshold, operation proceeds to step 426, where the processing continues without modification of the user interface. Operation proceeds from either steps 420, 424, or 426, to step 428, where the processing of the received speech segment for purposes of controlling the user interface is stopped.

Processing of additional speech input in accordance with the method of FIG. 4 may continue over time with modifications to the user interface being made as a function of detected stress level. For example, in one embodiment the stress level indicator value detected during each of a different plurality of time periods is monitored to determine if the user continues to suffer from a highly stressed emotional state as indicated by the stress level indicator value remaining above a particular set threshold for a period of time. In one such embodiment, where the user interface is part of an emergency call servicing apparatus, the user is transferred to a human operator in response to continuing to detect a highly stressed emotional state despite implementing one or more of the above described user interface modifications.

Numerous variations on the above described user interface technique are possible. For example user interface modifications can, and in at least one embodiment are, based on the detected experience level or expertise of a user in addition to the user's detected emotional state. In some embodiments images as opposed to speech are used as the input from which a user's emotional state are determined. Other embodiments falling within the scope of the invention will be apparent to those skilled in the art based on the above detailed description and figures included in the present application.

What is claimed is:

1. A method controlling an apparatus, the method comprising the steps of:
modifying a user interface in response to detecting that an emotional state indicator value exceeds a first threshold, including slowing the rate at which prompts are provided to a user of said apparatus, the method further comprising, prior to performing said modifying step:
generating said emotional state indicator value from user input; and
comparing said emotional state indicator value to said first threshold to detect if said emotional state indicator value is above said first threshold.

2. A method controlling an apparatus, the method comprising the steps of:
modifying a user interface in response to detecting that an emotional state indicator value exceeds a first threshold, including increasing the length of a pause between sentences included in speech generated by said user interface, the method further comprising, prior to performing said modifying step:
generating said emotional state indicator value from user input; and
comparing said emotional state indicator value to said first threshold to detect if said emotional state indicator value is above said first threshold, wherein said emotional state indicator is a stress level value, the step of generating an emotional state indicator value including:
performing stress analysis on received speech to generate said stress level value.

3. A method controlling an apparatus, the method comprising the steps of:
modifying a user interface in response to detecting that an emotional state indicator value exceeds a first threshold, including reducing the number of options presented to a user as part of a menu from which the user can make a selection, the method further comprising, prior to performing said modifying step:
generating said emotional state indicator value from user input; and
comparing said emotional state indicator value to said first threshold to detect if said emotional state indicator value is above said first threshold, wherein said emotional state indicator is a stress level value, the step of generating an emotional state indicator value including:
performing stress analysis on received speech to generate said stress level value.

4. A method controlling an apparatus, the method comprising the steps of:
modifying a user interface in response to detecting that an emotional state indicator value exceeds a first threshold, including slowing the rate at which prompts are provided to a user of said apparatus;
increasing the length of a pause between sentences included in speech generated by said user interface; and
reducing the number of options presented to a user as part of a menu from which the user can make a selection; the method further comprising, prior to performing said modifying step:
generating said emotional state indicator value from user input; and
comparing said emotional state indicator value to said first threshold to detect if said emotional state indicator value is above said first threshold, wherein said emotional state indicator is a stress level value, the step of generating an emotional state indicator value including:
performing stress analysis on received speech to generate said stress level value.

5. A method controlling an apparatus, the method comprising the steps of:

modifying a user interface in response to detecting that an emotional state indicator value exceeds a first threshold, the method further comprising, prior to performing said modifying step:

receiving speech from a user;

generating said emotional state indicator value from said received speech; and comparing said emotional state indicator value to said first threshold to detect if said emotional state indicator value is above said first threshold; the method further comprising the steps of:

periodically performing said generating step using speech input received during different periods of time to generate a set of emotional state indicator values, each emotional state indicator value corresponding to a different period of time; and monitoring said emotional state indicator values to determine if the generated emotional state indicator values stay above a second threshold for more than one period of time.

6. A method controlling an apparatus, the method comprising the steps of:

modifying a user interface in response to detecting that an emotional state indicator value exceeds a first threshold, the method further comprising, prior to performing said modifying step:

receiving speech from a user;

generating said emotional state indicator value from said received speech; and comparing said emotional state indicator value to said first threshold to detect if said emotional state indicator value is above said first threshold; the method further comprising the steps of:

periodically performing said generating step using speech input received during different periods of time to generate a set of emotional state indicator values, each emotional state indicator value corresponding to a different period of time; and connecting a caller from which said speech input is received to a human service representative when it is determined that one of the generated emotional state indicator values exceed a second threshold for more than one period of time.

7. The method of claim 5, wherein said apparatus is a telephone call servicing apparatus, the method further comprising the step of:

connecting a caller from which said speech input is received to a human service representative when it is determined that the generated emotional state indicator values stay above said second threshold for said more than one period of time.

8. The method of claim 7, wherein said telephone call servicing apparatus is a telephone operator terminal.

9. An apparatus used to interact with a user of said apparatus, the apparatus including:

a user interface including:

means for detecting the emotional state of said user, including a module for generating a stress level value; and an output circuit for adjusting an output presented to said user as a function of the detected emotional state of said user, wherein said output to said user is a voice prompt; and where said output circuit for adjusting an output presented to said user includes:

control logic for adjusting the rate of speech included in said voice prompt as a function of a generated stress level value, control logic for altering prompts presented to said user as a function of said generated stress level value, and control logic for adjusting prompts as a function of the experience level of the user.

* * * * *